(No Model.)
F. F. SIDDALL.
AUTOMATIC SAFETY COUPLING.
No. 601,483. Patented Mar. 29, 1898.
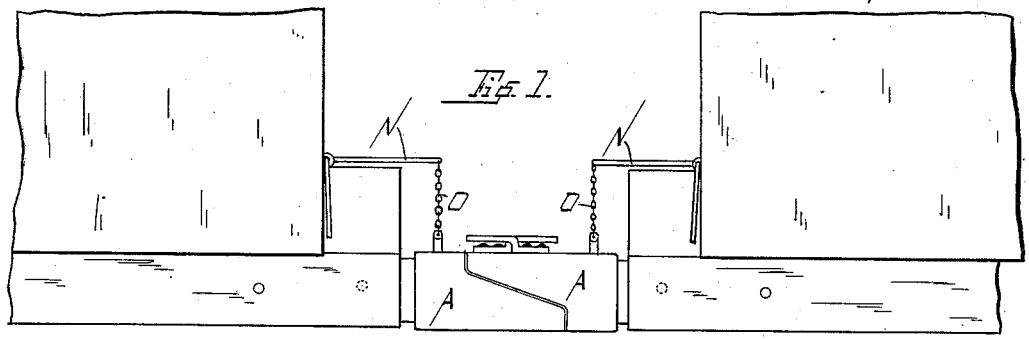
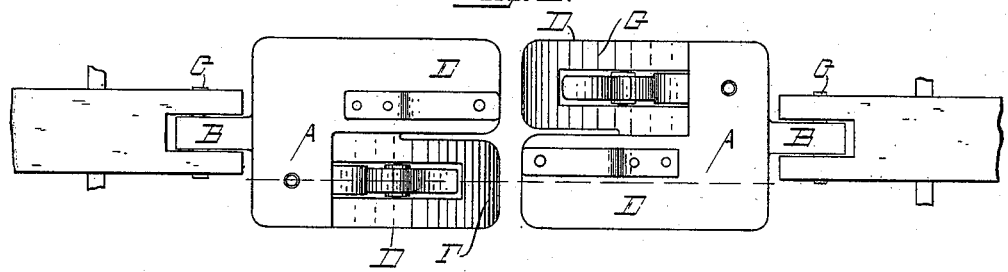
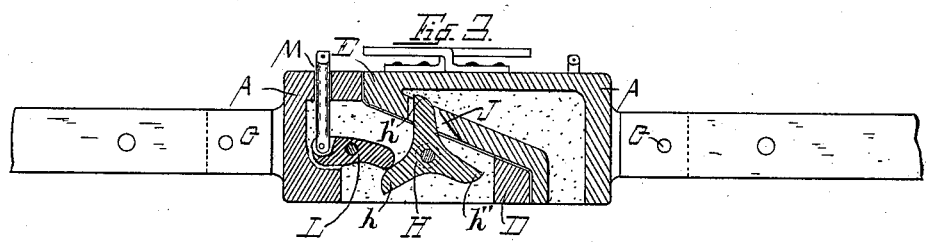
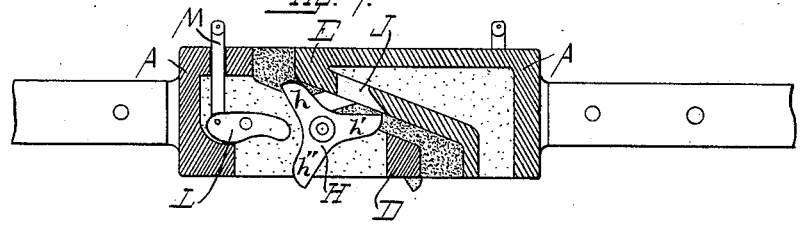
Witnesses.
Inventor.
Frederick F. Siddall
By Erwin Wheeler & Wheeler
Attorney.

UNITED STATES PATENT OFFICE.

FREDERICK F. SIDDALL, OF CHICAGO, ILLINOIS.

AUTOMATIC SAFETY-COUPLING.

SPECIFICATION forming part of Letters Patent No. 601,483, dated March 29, 1898.

Application filed September 27, 1897. Serial No. 653,087. (No model.)

*To all whom it may concern:*

Be it known that I, FREDERICK F. SIDDALL, a citizen of the United States, residing at Chicago, in the county of Cook and State of Illinois, have invented new and useful Improvements in Automatic Self-Adjusting Safety-Couplings, of which the following is a specification.

My invention relates to improvements in automatic self-adjusting safety-couplings for railway-cars.

The objects of my invention are, first, to provide a form of automatic coupling which can be used for cars of various sizes and which will adequately secure the cars together; second, to provide a coupling the members of which cannot be broken or injured by contact with cars equipped with different styles of couplers; third, to provide for the engagement of one of my coupling members with a coupler of different form.

In the following description, reference is had to the accompanying drawings, in which—

Figure 1 is a side view of my invention as it is applied to the cars. Fig. 2 is a top view of my invention, showing the draw-heads separated. Fig. 3 is a section view drawn on line x x of Fig. 2, but showing the draw-heads united. Fig. 4 is a similar view showing the draw-heads as they appear when moving into engagement.

Like parts are identified by the same reference-letters throughout the several views.

The coupling members A A are secured to the respective ends of the cars by bars B, to which they are attached by a hinge-pin C. The draw-heads A are attached to the cars by means of bars B, to which they are secured by hinge-pins C. The draw-heads are provided with lapping portions D and E, having the oppositely-inclined surfaces F and G, so that each is adapted to become the counterpart of any other to form a coupling-joint. Owing to the inclination of the surfaces F and G it is obvious that draw-heads will readily engage with each other, even though at different elevations, and as they are free to move on the hinge-pin C the opposing surfaces will readily coincide. Each draw-head is provided with a centrally-fulcrumed locking-lever H, provided with arms $h\ h'\ h''$ and located in the interior. The lever is so arranged that one of its arms $h'$ projects through a slot I in the surface F.

Referring to Fig. 4, it will be observed that as the portion E of an opposing draw-head moves over the surface F, the exposed arm $h$ of the lever H is forced backwardly and downwardly, as shown in Fig. 4, and the arm $h'$ raised into engagement in the recess J of the opposing surface G. As the continued approach of the cars causes the surfaces F and G to coincide, the arm $h'$ is raised to a vertical position and the arm $h$ is rocked downwardly and engaged underneath a detent L, which prevents a reverse movement.

As each draw-head is provided with oppositely-inclined surfaces F and G, which engage, respectively, underneath and above the inclined surfaces of the other, it is evident that the upwardly-projecting arms $h'$ of the lever H will securely bind the parts together by reason of their engagement in the recesses J.

For disengaging the coupling I have provided a vertical pin M, which is attached to the rear or heavier end of the detent L and projects upwardly through the draw-head. The upper end of the pin M is connected with a releasing-lever N by means of a chain O, so that by rocking the lever N upon its fulcrum the pin is raised to tilt the detent L and release the arm engaged by it, thus permitting the lever H to rotate in the reverse direction and withdraw from the recess J.

For engaging couplers of other styles I have provided each draw-head with an offset-bar O and a coupling-pin P, which runs through a hole in the bar O and engages in a similar hole in or through the draw-head. By this means the ordinary link-coupling is made available when one of the cars is not equipped with my form of coupler.

Having thus described my invention, what I claim as new, and desire to secure by Letters Patent, is—

1. In an automatically-locking car-coupler, a draw-head, having portions thereof provided with oppositely-inclined faces, adapted to engage respectively above and below the similarly-formed faces of a counterpart draw-head, a lever having three or more arms fulcrumed within the draw-head, and arranged so that one of its arms projects upwardly through a slot in one of the inclined faces, a recess in the other of said faces adapted to be engaged by the lever of an opposing draw-head, and a detent adapted to engage one of the depressed arms of said lever, to prevent a reverse movement, substantially for the purpose set forth.

2. In an automatically-locking car-coupler, a draw-head having portions thereof provided with oppositely-inclined faces, adapted to engage respectively above and below the similarly-formed faces of a counterpart draw-head, a lever having three or more arms fulcrumed within the draw-head, and so arranged that one of its arms projects upwardly through a slot in one of the inclined faces, a recess in the other of said faces, adapted to be engaged by the lever of an opposing draw-head, a detent adapted to engage one of the depressed arms of said lever to prevent a reverse movement, and a pin for disengaging the detent from the lever-arm, substantially for the purpose set forth.

3. In an automatically-locking car-coupler, a draw-head hinged to a supporting-bar and having portions thereof provided with oppositely-inclined faces adapted to engage respectively above and below the similarly-formed faces of a counterpart draw-head, a lever having three or more arms fulcrumed within the draw-head and arranged so that one of its arms projects upwardly through a slot in one of the inclined faces, a recess in the other of said faces adapted to be engaged by the lever of an opposing draw-head, and a detent adapted to engage one of the depressed arms of said lever to prevent a reverse movement, substantially for the purpose set forth.

4. In an automatically-locking car-coupler, a draw-head having portions thereof provided with oppositely-inclined faces adapted to engage respectively above and below the similarly-formed faces of a counterpart draw-head, a lever having three or more arms fulcrumed within the draw-head and arranged so that one of its arms projects upwardly through a slot in one of the inclined faces, a recess in the other of said faces adapted to be engaged by the lever of an opposing draw-head, and a detent adapted to engage one of the depressed arms of said lever to prevent a reverse movement, together with an offset-bar, located on the upper surface of the draw-head and provided with a coupling-pin adapted to engage a coupling-link of ordinary style, substantially for the purpose set forth.

5. In an automatically-locking car-coupler, a draw-head having portions thereof provided with oppositely-inclined faces, adapted to engage respectively above and below the similarly-formed faces of a counterpart draw-head, a lever having three or more arms fulcrumed within the draw-head, and so arranged that one of its arms projects upwardly through a slot in one of the inclined faces, a recess in the other of said faces adapted to be engaged by the lever of an opposing draw-head, a detent adapted to engage one of the depressed arms of said lever to prevent a reverse movement, and a pin for disengaging the detent from the lever-arm, together with a releasing-lever located on the car, and a chain connecting the releasing-lever with the said pin, substantially for the purpose set forth.

In testimony whereof I affix my signature in the presence of two witnesses.

FREDERICK F. SIDDALL.

Witnesses:
 FRANK BIRD,
 ADELBERT E. WHITNEY